Patented Jan. 19, 1954

2,666,751

UNITED STATES PATENT OFFICE 2,666,751

SPONGE RUBBER COMPOSITION AND METHOD OF MAKING SPONGE RUBBER

Harry L. Wunderly, Cuyahoga Falls, Ohio, assignor to The General Tire and Rubber Company, Akron, Ohio, a corporation of Ohio No Drawing. Application September 16, 1949, Serial No. 116,209

9 Claims. (Cl. 260—2.5)

The present invention relates to a method of making chemically blown sponge rubber. It particularly relates to a process of making chemically blown sponge rubber having exceedingly low density and to a blowing agent suitable for use in preparing such sponge rubber.

Sponge rubber is made by two general processes. In the oldest process, known as the "chemically blown" process, the rubber is masticated or otherwise compounded to have a comparatively great plasticity, mixed with blowing agents and curing agents, incorporated in the mold and caused to expand by gas liberated during the vulcanizing process so that it fills the mold and forms a molded sponge rubber article. In the other process, known as the latex process, a suitable rubber latex is simply whipped into a froth and the fluid gelled and cured by suitable means without permitting its reversion to the unfrothed state.

Chemically blown sponge rubber in recent years has lost considerable ground to sponge rubber produced directly from latex. This has primarily been caused by the fact that latex sponge rubber has had considerably lower density and has much greater porosity than the chemically blown sponge rubber heretofore produced. Comparatively recently developed nitrogen-evolving blowing agents, such as dinitroso-pentamethylene tetramine available under the trade name Unicel N. D., as well as diazoamino benzene, etc. have considerably improved the character of sponge rubber produced by the chemically blown process. However, the product has not been as desirable for most applications as has been latex sponge rubber; neither has it been possible to consistently obtain sponge rubber of very low density and of fine and uniform pore structure. Sponge rubber produced by chemically blown processes, however, are considerably less expensive to manufacture, due primarily to the lower materials cost, than is sponge rubber produced from latex. If the sponge can be produced with sufficiently low density, it is substantially as desirable for many applications.

It is an object of the present invention to provide a relatively low cost sponge rubber that may be substituted for the latex sponge now used in many applications, for example in furniture, mattresses, seat cushions, weather strips and the like.

It is another object of the present invention to provide a method of producing an exceedingly low density chemically blown sponge in which the pores thereof are relatively uniform and small.

It is another object of the present invention to provide a blowing agent capable of being incorporated into rubber compounds of the type generally suitable for preparing sponge rubber by the chemically blown process, which when incorporated will provide substantially improved sponge of very low density.

It is another object of the present invention to provide a blowing agent which is more efficient in producing low density sponge than those in the past.

Other objects will be apparent from the following description of the invention.

In the preparation of chemically blown sponge rubber by processes wherein the sponge is blown at least in part by gases evolved from polyamino blowing agents, such as dinitroso-pentamethylene tetramine, etc., it has frequently been customary to incorporate into the sponge rubber mix one of the conventional retarders for rubber compounds, such as salicylic acid and benzoic acid. Such retarders have improved the maximum blow obtained by sponge rubber containing these compounds and it has been considered that the improvement was the result of the delay in cure of the sponge rubber, so that the stiffness of the sponge during the early blowing process was considerably reduced.

I have found that when a comparatively strong organic sulfonic acid is incorporated with the polyamine types of blowing agents, such as dinitroso-pentamethylene tetramine, in rubber mixes, sponge rubber of exceedingly low density may be obtained. Such sponge rubbers compare favorably with the more expensive sponge rubber obtained directly from latex.

The organic sulfonic acids apparently are peculiar in obtaining a substantially increased blow of sponge rubber compounds containing the polyamine-type of blowing agents. I have tested a large number of organic and inorganic acids in sponge rubber compounds, and I am unable to obtain densities even approaching those obtained with the organic sulfonic acids. The organic sulfonic acids may be of aliphatic and/or aromatic character. Preferably, they are sulfonic acids of hydrocarbons, i. e. they have a mono-valent hydrocarbon group that carries sulfonic acid. They may be used in place of or in conjunction with the usual retarders, such as salicylic acid.

The sulfonic acids suitable for increasing the blow of sponge rubber compounds containing polyamino blowing agents, such as dinitroso-pentamethylene tetramine, include the alkane sulfonic acids such as methane sulfonic acid, ethane sulfonic acid, butane sulfonic acid, hexane sulfonic acid, and mixtures of such sulfonic acids. The aromatic sulfonic acids include naphthalene sulfonic acid, benzene sulfonic acid, toluene sulfonic acid, phenol sulfonic acid and the like, as well as the aralkyl sulfonic acids, such as the sulfonic acid which is produced by sulfonating alkyl benzene and the like.

The aforementioned sulfonic acids are used in the sponge rubber mixes in relatively small amounts. Generally, less of the sulfonic acid is desirable than the amount of polyamino-containing blowing agent. Even small amounts of organic sulfonic acids, such as .5% based on the weight of the rubbery polymer in the rubber compound, are noticeably effective in improving blow. However, large quantities, such as 1 to 10%, based on the weight of the rubbery polymer, are more desirable and about 3 to 6% are usually used.

The blowing agents which I have found to be most effective comprise a mixture of dinitroso-pentamethylene tetramine and one or more of the above-mentioned organic sulfonic acids.

The polyamine component of the blowing agent, preferably dinitroso-pentamethylene tetramine, may be present in amounts of 1 to 15% or so to provide sponge rubber of good quality. Superior results are obtained when the amount of the polyamine component of the blowing agent is substantially over 2%, and 3 to 8% is generally used.

In preparing the sponge rubber in accordance with the process of the present invention, the rubbery polymer is mixed and compounded in a manner exactly analogous to that previously used with the exception of the combination of polyamine and organic sulfonic acid. Generally, the rubbery polymer is masticated with a suitable peptizer or plasticizer, such as that sold under the trade name Peptone-22, to produce a highly viscous (or low Mooney) material, such for example as one having a Mooney reading of less than 35 or 40 on a Mooney Plastometer. The rubbery polymer is compounded with a curing agent, such for example as sulfur, activators such as zinc oxide, a suitable accelerator such as any of the conventional accelerators heretofore utilized for sponge rubber, etc. Examples of accelerators are: Santocure (N-cyclohexyl-2-benzothiazole sulfenamide); Captax (mercapto benzothiazole). So-called ultra-accelerators which have exceedingly fast curing action are not generally as desirable as are accelerators having more moderate curing rates, particularly when relatively thick articles are to be prepared. Generally, a substantial amount of oily plasticizer, such as petrolatum, as well as a nonreinforcing type of pigment are also incorporated. The separate components of the above-mentioned blowing agent combination is preferably incorporated near the end of the mixing cycle.

The plastic compound thus prepared is thereafter incorporated into a heated zone to cause release of gas from the blowing agent to expand the product and to cure the expanded product. The temperature may be any above 100° C. and is preferably 100° C. to 200° C.

The following example, in which parts are by weight, illustrate the present invention:

| | Parts |
|---|---|
| Pale crepe with 1% Peptone-22 as plasticizer | 1,010 |
| Sulfur | 30 |
| Santocure | 15 |
| Stearex flakes | 100 |
| Zinc oxide | 50 |
| Gastex | 150 |
| Petrolatum | 200 |
| Unicel N. D | 60 |

The above ingredients were mixed on a rubber mill in the usual manner to provide a base compound. This compound was divided into nine portions. To each of the portions were added five parts of one of the compounds shown in Table 1.

A series of sponge discs were prepared from each of the above portions compounded with the additive shown by incorporating 2.5 grams, 3 grams, 3.5 grams, 4 grams, 4.5 grams and 5 grams of each portion in a mold of the same size. These molds were heated with steam at 60 pounds' pressure. The portions were allowed to remain twenty minutes in the mold, whereupon the mold was opened. The smallest amount of material required to completely fill the mold is shown in Table 1. It will be seen from Table 1 that only the organic sulfonic acids of those acids tested cause the production of a light density sponge, one in which the mold was completely filled by the smallest quantity of sponge-producing compound.

Table 1

| Portion | Additive | Grams [1]—Pore structure |
|---|---|---|
| 1 | Methane sulfonic acid | 2½ uniform fine cells. |
| 2 | Benzene sulfonic acid | Do. |
| 3 | Ethane sulfonic acid | Do. |
| 4 | Mono-calcium phosphate | 3½ coarse cells. |
| 5 | Mono-amyl acid phosphate | 3½ fine cells. |
| 6 | Mono-diamyl acid phosphate | 4 fine cells. |
| 7 | Mono-zinc orthophosphate | 3 coarse cells. |
| 8 | Ethylene dinitrito tetra-acetic acid | 4½ uneven cells. |
| 9 | Gamma polyoxymethylene | 5 very fine cells. |

[1] Grams of compounded stock to fill cavity.

I have tried a great many other acids and acidic substances, including sulfuric and phosphoric acids in various compounds of the above general type, in an endeavor to find other materials which are equivalent to the benzene sulfonic acids to produce increased blow with a polyamine-type of blowing agent. All such substances have failed to give any improvement at all commensurate with the organic sulfonic acids. I have also tried various combinations of other blowing agents, both inorganic and organic, with various inorganic and organic acidic materials, but I have been unable to produce sponge of low density with any of the other combinations.

In the above example, the pale crepe may be substituted by other vulcanizable rubbery polymers, including other types of natural rubber, rubber reclaims and synthetic rubbers, such as the polymers of butadiene, isoprene and other conjugated diolefins having less than seven carbon atoms and copolymers of these materials with mono-olefinic compounds copolymerizable therewith, including styrene, acrylonitrile and the like. Polymers of other diolefinic compounds such as chloroprene, cyanoprene and the like may also be used in obtaining benefits for the above combination of blowing agent containing heatunstable polyamine, i. e. any organic polyamine that breaks down between 150° F. and 350° F. to yield nitrogen, and an organic sulfonic acid.

By the process of the present invention, one is able to consistently obtain pigmented chemically blown sponge rubber of such almost unheard of low densities as .075 or even .070 oz. per cubic inch. Such sponge rubber compares very favorably with the more expensive latex sponge without pigments. This is especially the case since the pore structure is fine and comparatively uniform in the sponge produced in accordance with the process of the present invention.

Although the invention may be employed in various ways, only preferred embodiments have been illustrated and described. Other embodiments may be made within the invention as provided by the patent statutes.

What I claim is:

1. The process of making sponge rubber which comprises incorporating into a plastic vulcanizable rubber compound containing suitable curing agents, one to fifteen parts of a dinitroso-pentamethylene tetramine, and one-half to ten parts of an organic sulfonic acid, and thereafter heating the plastic rubber compound to a curing temperature while allowing it to expand.

2. In a method of producing sponge rubber of the chemically blown type, wherein a vulcanizable rubbery polymer is masticated with suitable curing agents and vulcanizing agents to provide a plastic vulcanizable compound, and the compound incorporated in the mold and allowed to expand and cure at elevated temperature, the step which comprises incorporating into said vulcanizable rubber compound prior to the curing step one to fifteen parts of a dinitroso-pentamethylene tetramine and one-half to ten parts of an organic sulfonic acid.

3. The method of claim 2 wherein the organic sulfonic acid is an aromatic sulfonic acid.

4. The method of claim 3 wherein the organic sulfonic acid is benzene sulfonic acid.

5. The method of claim 2 wherein the amine blowing agent is a dinitroso-pentamethylene tetramine and the organic sulfonic acid is an alkane sulfonic acid.

6. The method of claim 2 wherein the amine blowing agent is a dinitroso-pentamethylene tetramine and the organic sulfonic acid is an ethane sulfonic acid.

7. A vulcanizable compound suitable for the preparation of sponge rubber articles, which comprises a rubbery polymer having mixed therethrough one to fifteen parts of a dinitroso-pentamethylene tetramine and one-half to ten parts of an organic sulfonic acid.

8. The product of claim 7 wherein the organic sulfonic acid contains a mono-valent hydrocarbon group.

9. The process of making sponge rubber which comprises incorporating into a plastic vulcanizable rubber compound containing suitable curing agents, three to eight parts of dinitroso-pentamethylene tetramine, and up to three to six parts of an organic sulfonic acid, and thereafter heating the plastic rubber compound to a curing temperature while allowing it to expand.

HARRY L. WUNDERLY.

References Cited in the file of this patent

UNITED STATES PATENTS

| Number | Name | Date |
|---|---|---|
| 1,871,037 | Cadwell | Aug. 9, 1932 |
| 2,466,826 | Romaine | Apr. 12, 1949 |
| 2,491,709 | Briggs et al. | Dec. 20, 1949 |